United States Patent
Ricard et al.

(10) Patent No.: US 8,131,709 B2
(45) Date of Patent: Mar. 6, 2012

(54) MECHANISM FOR PROVIDING EFFICIENT ACCESS TO REDUNDANT NUMBER REPRESENTATIONS

(75) Inventors: Gary Ross Ricard, Chatfield, MN (US); William Jon Schmidt, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1913 days.

(21) Appl. No.: 11/035,718

(22) Filed: Jan. 14, 2005

(65) Prior Publication Data
US 2006/0161574 A1 Jul. 20, 2006

(51) Int. Cl.
*G06F 17/30* (2006.01)
(52) U.S. Cl. .................................... 707/713; 707/715
(58) Field of Classification Search ............... 707/5, 2, 707/4, 6, 713, 715, 706, 741, 602, 780, 779, 707/765; 702/20; 435/6
See application file for complete search history.

(56) References Cited

U.S. PATENT DOCUMENTS

| | | | |
|---|---|---|---|
| 6,167,399 A * | 12/2000 | Hoang | 707/5 |
| 6,437,715 B1 | 8/2002 | Cowlishaw | |
| 6,525,679 B1 | 2/2003 | Cowlishaw | |
| 2003/0172368 A1 * | 9/2003 | Alumbaugh et al. | 717/106 |
| 2004/0009495 A1 * | 1/2004 | O'Malley et al. | 435/6 |
| 2005/0165850 A1 * | 7/2005 | Mosescu | 707/200 |
| 2005/0289208 A1 * | 12/2005 | Harrison et al. | 708/502 |

OTHER PUBLICATIONS

Chris Olston et al., "Adaptive Precision Setting for Cached Approximate Values," Proceedings of the 2001 ACM SIGMOD International Conference on Management of Data, pp. 355-366.
"Optimizing Reports and Other Types of Retrieval," Database Administrator's Guide, http://64.233.179.104/search?q=cache:Kc8KWHe4egEJ:dev.hyperion.com/techdocs/essb...
"Draft Standard for Floating-Point Arithmetic P754/D0.8.6," Dec. 13, 2004, IEEE Standards Activities Department, Institute of Electrical and Electronics Engineers, Inc.

* cited by examiner

*Primary Examiner* — Charles Rones
*Assistant Examiner* — Fariborz Khoshnoodi
(74) *Attorney, Agent, or Firm* — Roy W. Truelson

(57) ABSTRACT

Disclosed are an apparatus, method, and program product which each provide an enhanced database engine. Access to precise values is provided while permitting unfettered access to those who are not interested in precise values. This is accomplished via an enhanced database index and indexing method. The entries of the database index are normalized to exclude precision. Individuals interested in precision can then specify precision as part of their query through use of a PRECISE keyword. Results are then filtered to account for the specified precision.

19 Claims, 5 Drawing Sheets

MECHANISM FOR PROVIDING EFFICIENT ACCESS TO REDUNDANT NUMBER REPRESENTATIONS

FIELD OF THE INVENTION

The present invention relates to database systems and, more particularly, to providing access to redundant number representations within a database.

BACKGROUND OF THE INVENTION

This patent pertains to numbers and numbering systems. It is fair to say that the concept of a numerical system has been around for a while. Indeed, associating a number with a quantity is very literally an age old practice. While systems have varied, most are based upon ten different numbers. This commonality is attributable to the fact that humans have ten combined fingers (i.e., digits) on their two hands. The most obvious example of a system based upon ten digits is the decimal system (i.e., possible single digit numbers are 0 through 9). However, while base ten systems are the most popular, other systems (e.g., binary, octal, and hexadecimal) are equally effective mathematically, and preferable in certain cases.

One such case is that of the typical computer system. Computer systems do not (typically) have fingers or digits. Instead they rely upon different voltage levels to represent different numbers. From a design and cost perspective, it is much easier to represent two different numbers (i.e., 0 and 1) than it is to represent ten different numbers (i.e., 0 through 9). Therefore the binary number system (i.e., base 2) is used to internally represent numbers in most computer systems. An extension to the binary numbering system is a standard that is referred to as the Binary Floating Point Standard (IEEE 754-1985). This standard is an agreed upon way to represent multi-digit numbers in binary.

When the computer system's internally represented binary numbers are presented to the user, they are typically converted into base 10 so that they can be more easily understood. Some base 2 numbers, though, do not convert well to base 10 because the conversion results in an indefinitely repeating fraction. Said another way, for certain base 2 numbers, the conversion from base 2 to base 10 introduces rounding error. For this reason, the standards community is at work developing a new decimal floating point standard (IEEE-SA 754R).

Included within this standard is the notion of a cohort. Unlike binary floating-point formats, a number may have multiple representations in the new decimal floating-point format. The set of floating-point representations a number maps to is called the number's cohort. Said another way, the members of a cohort are distinct representations of the same number. For example: 2.0, 2.00, and 2.000, are three representations of the same number and are members of the same cohort. These different representations are permitted because they have significance to some computer system users. For example, a measurement of 2.0 grams to a chemist has a different meaning than a measurement of 2.000 grams. Specifically, the chemist knows that a measurement of 2.000 grams means that the item weighs between 1.9995 and 2.0005 grams, whereas a measurement of 2.0 means it weighs between 1.95 and 2.05 grams. This notion is known as precision.

While it is clear that the use of cohorts within the standard provides value, this value is not without cost. The cost is associated with accessing cohorts stored in a database. As is well-known, there are many different types of databases, but the most common is usually called a relational database. A relational database organizes data in tables that have rows, which represent individual entries or records in the database, and columns, which define what is stored in each entry or record. Each table has a unique name within the database and each column has a unique name within the particular table. Most databases also use indexes, which are very important data structures that inform the database management system of the location of a certain row in a table (or tables) given an indexed column value, analogous to a book index informing the reader on which page a given word appears. Thus each distinct column value in the table appears in the index along with the location of all of the rows containing that value. Database indexes are important because they are used to speed access to the database. Of course, when the database performs better, the computer system performs better, and when the computer system performs better, the computer system's users are more satisfied, which of course translates into more sales for the computer system maker.

The specific problem addressed in this patent is the fact that the notion of a cohort introduces multiple column values for the same number into the database index. Taking the above example, three different rows respectively containing the numbers 2.0, 2.00, and 2.000 would each be represented individually in the database index. Thus, the computer system will need to consider multiple database index entries to locate all the values that are mathematically equivalent to 2.0, which slows performance. Of course, individuals interested in the precision of the various numbers would appreciate this indexing approach because the database remains efficient for them. The issue, though, is that most computer system users are not interested in the differences between 2.0, 2.00, and 2.000. To them a 2 is a 2 is a 2. Thus, from a performance perspective, the introduction of the notion of a cohort penalizes the many in favor of the few.

Without an improved system, the value associated with use of cohorts, as set forth in IEEE-SA 754R, will continue to be diminished by the performance costs levied upon the majority of computer system users.

SUMMARY OF THE INVENTION

The present invention involves an apparatus, method, and program product which provides an enhanced database engine. The database engine provides access to precise values for those interested while permitting unfettered access to those who are not interested in precise values. This is accomplished via an enhanced database index and indexing method. The entries of the database index are normalized to exclude precision. Individuals interested in precision can then specify precision as part of their query through use of a PRECISE keyword. Results are then filtered to account for the specified precision.

DESCRIPTION OF THE PREFERRED EMBODIMENT

Figure 1:
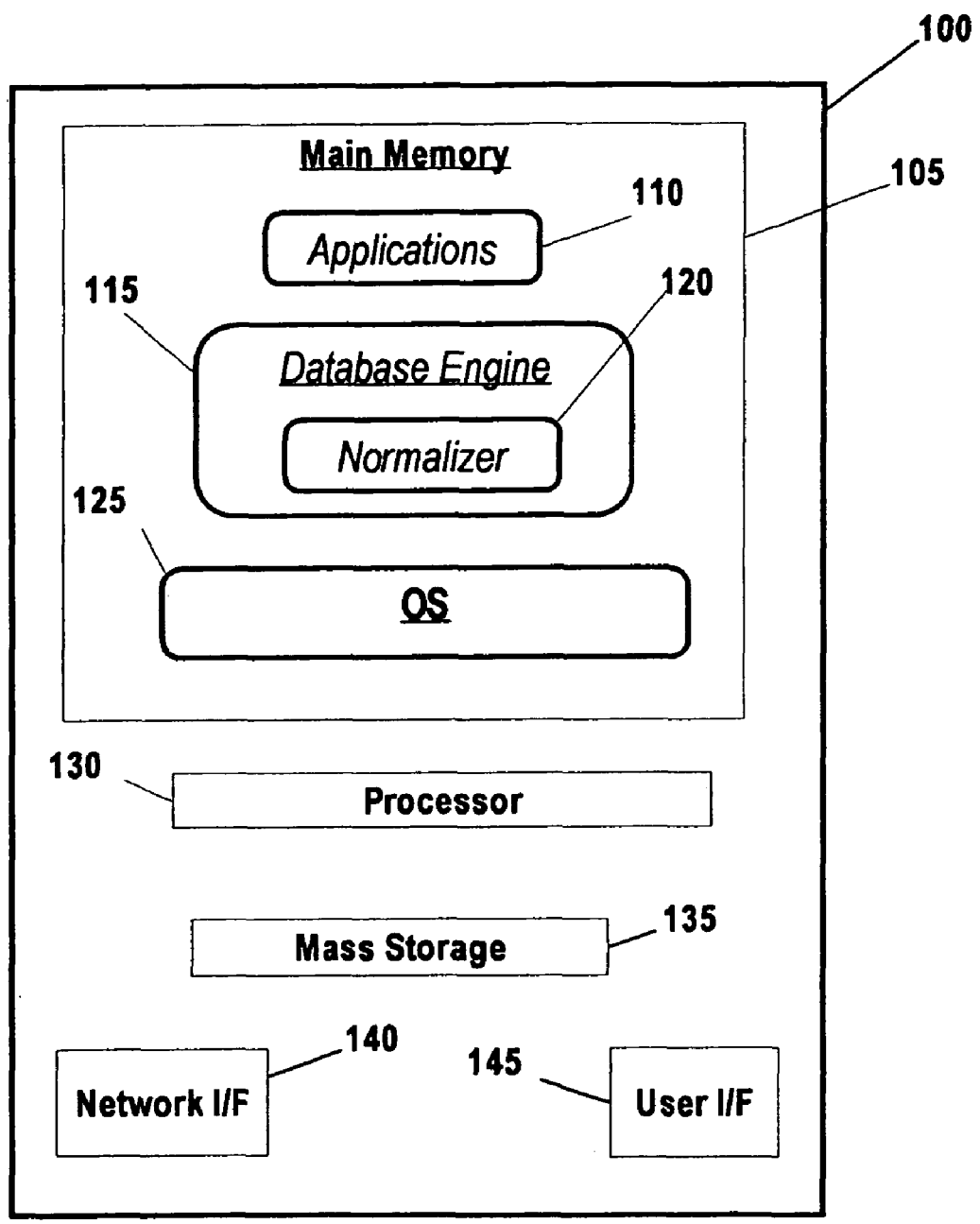
FIG. 1 is a block diagram showing a computing environment that is capable of supporting the preferred embodiments of the present invention.

Turning now to the drawings, FIG. 1 shows some of the operational components used in the computing environment of the preferred embodiment of the present invention. Computer system 100 is an enhanced IBM iSeries computer system, although other computer systems could be used. Depicted components include: Main Memory 105, Processor 130, Mass Storage 135, Network Interface 140, and User Interface 145. Processor 130 is a PowerPC processor used in iSeries computer systems, which is used in the preferred embodiments in the conventional way. Main Memory 105 is also used in the preferred embodiments in the conventional manner. Mass Storage 135 is used in FIG. 1 to represent one or more secondary storage devices such as magnetic or optical media. Network Interface 140 is used to communicate with other computer systems, while User Interface 145 is used to accept commands and relay information to the one or more users of Computer System 100.

Shown within Main Memory 105 is Operating System 125. Operating System 125 is that known in the industry as IBM i5/OS. Shown utilizing Operating System 125 are Applications 110 and Database Engine 115. Applications 110 are programs that make use of the facilities provided by Database Engine 115, which is responsible for providing managed access to information stored on Computer System 100. Shown within Database Engine 115 is Normalizer 120. Normalizer 120, which is described in more detail in subsequent paragraphs, is responsible for generating database indices, which themselves provide more efficient access to information stored on the system. It should be noted that while Normalizer 120 is shown and described herein as a separate entity for the purposes of explanation, it could well be incorporated into Database Engine 115.

It should be noted that while the inventors have set forth a specific hardware platform within this specification, the present invention and the preferred embodiments should be considered fully applicable to other platforms. It should be further understood that while the embodiments of the present invention are being described herein in the context of a complete system, the program mechanisms described (e.g., Database Engine 115, and Normalizer 120) are capable of being distributed in program product form. Of course, a program product can be distributed using different types of signal bearing media, including, but not limited to: recordable-type media such as floppy disks, CD ROMs, and memory sticks; and transmission-type media such as digital and analog communications links.

It should also be understood that embodiments of the present invention may be delivered as part of a service engagement with a client company, nonprofit organization, government entity, internal organizational structure, or the like. Aspects of these embodiments may include configuring a computer system to perform, and deploying software systems and web services that implement, some or all of the methods described herein. Aspects of these embodiments may also include analyzing the client company, creating recommendations responsive to the analysis, generating software to implement portions of the recommendations, integrating the software into existing processes and infrastructure, metering use of the methods and systems described herein, allocating expenses to users, and billing users for their use of these methods and systems.

Figure 2:
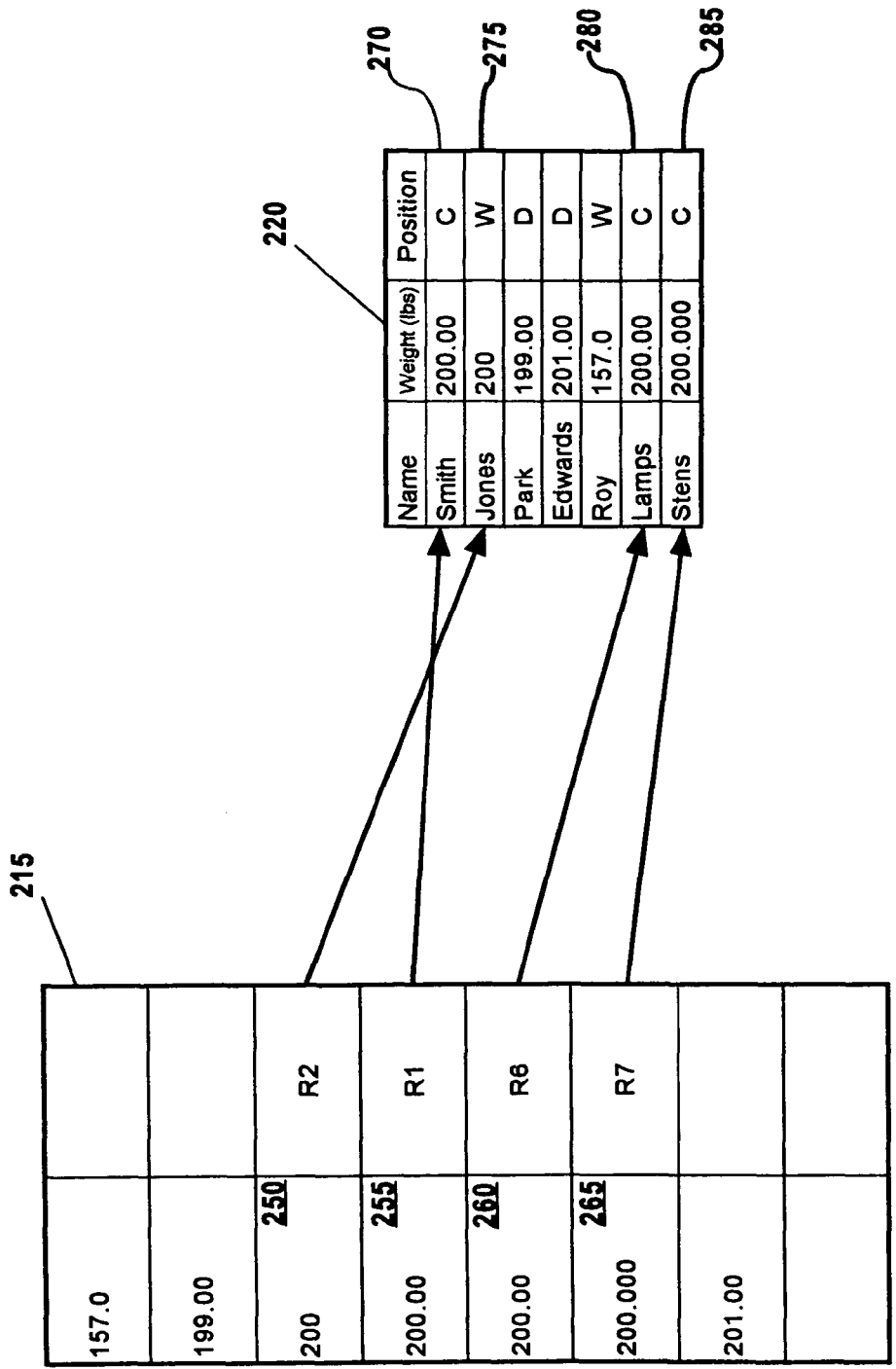
FIG. 2 shows a database index created in accordance with prior art index building mechanisms.

FIG. 2 shows a database index created in accordance with prior art index building mechanisms. As shown, several players have a weight that is mathematically equal to 200 lbs. Note, however, that precise values have been brought forward from table 220 into index 215. Therefore, when a user issues a query against table 220 to find all players with a weight of 200 lbs, the user must individually check each "200 entry" to determine which records actually satisfy their query. Said another way, the user must check (i.e., though a more complicated query, mathematical comparisons, or manually) each and every possible representation of 200 (i.e., 200, 200.0, 200.00, etc.) to actually determine which records are mathematically equivalent to the value 200. This, of course, represents additional time and effort on the part of the user.

Another problem with the prior art approach (not shown on FIG. 2) is the difficulty associated with collating precise values. Each data type used in an index requires a collation order that creates a unique representation for each distinct value such that the representation for value A appears earlier in the index than the representation for value B if, and only if, value A is less than or equal to value B. Because an index may be built over multiple columns of a database with differing data types (i.e., multiple keys), the key values for each record are usually converted to character form, and the multiple character strings appended together to form the overall index key. In the presence of cohorts, developing a correct collation ordering scheme can be difficult. For example, the character representation for 2.000 must be lexically less than the character representation for 2.1, even though the former has more digits. Furthermore, the database designer must decide whether 2.0 is less than 2.000 or vice versa, since all distinct values must compare unequal. These difficulties have solutions, but they pose a nuisance.

Figure 3:
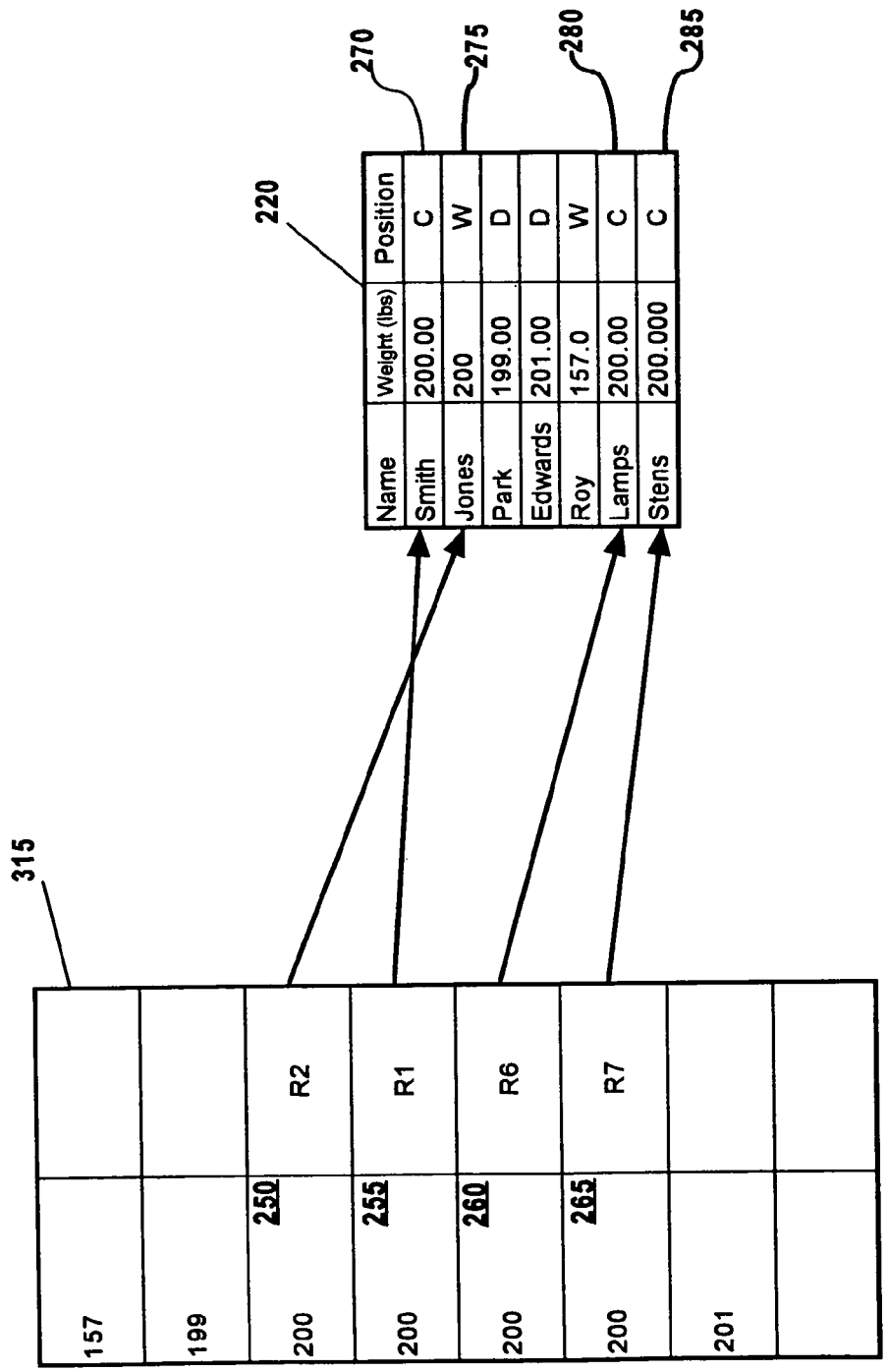
FIG. 3 shows how the database index of FIG. 2 would appear if created in accordance with the preferred embodiment of the present invention.

FIG. 3 shows how the database index of FIG. 2 would appear if created in accordance with the preferred embodiment of the present invention. As shown, the precise values of table 220 have not been brought forward into index 315. Thus, the user's query results simply show that players Smith, Jones, Lamps, and Stens each weigh 200 lbs. The user did not need to check each value against the whole set of possible representations to arrive at this conclusion. From a collating standpoint, each index value can be collated using standard character-based techniques because the one or more trailing zeros of the weight values of players Smith Lamps, and Stens need not be considered. If the user was particularly interested in the precise values of table 220, for example only those players whose weight was listed as 200.00, the user would simply include the PRECISE keyword as part of the query. This would cause the mechanism of the preferred embodiment to filter the returned results such that only the records for players Smith and Lamps were returned.

Figure 4:
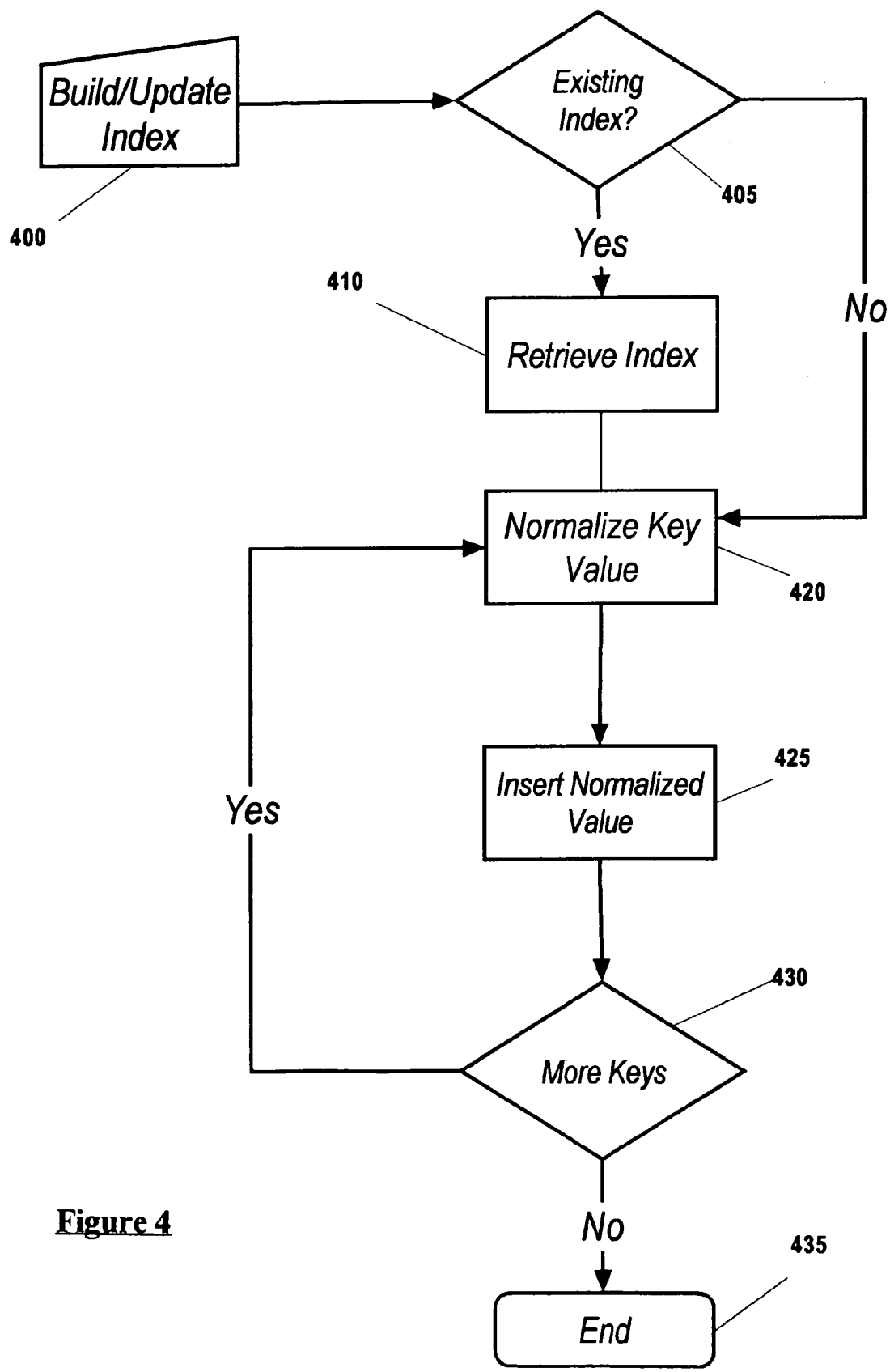
FIG. 4 is a flow diagram showing highlighted steps used to create and update database indexes according to the preferred embodiment of the present invention.

FIG. 4 is a flow diagram showing highlighted steps used to create and update database indexes according to the preferred embodiment of the present invention. (Note here that the acts of creating an index and updating an index both involve placing one or more entries.) Normalizer 120 of the preferred embodiment receives an index related request in block 400. This request is generated whenever a new index is being built by Database Engine 115 or whenever a new index entry is needed. If the index already exists, it is retrieved in block 410, prior to Normalization step 420. If the index does not exist, Normalizer 120 proceeds directly to Normalization step 420. Normalizer 120 normalizes the value associated with the identified key value. In the preferred embodiment, values are normalized by stripping off trailing zeros, although those skilled in the art appreciate that other approaches could be used. The normalized value is then inserted into the index [block 425]. Blocks 420 and 425 are then repeated for each key value. It should be noted that new indexes and updates to existing indexes may each involve multiple key values. The processing of Normalizer 120 then ends in block 435 after all of the keys have been normalized and inserted in the index.

Figure 5:
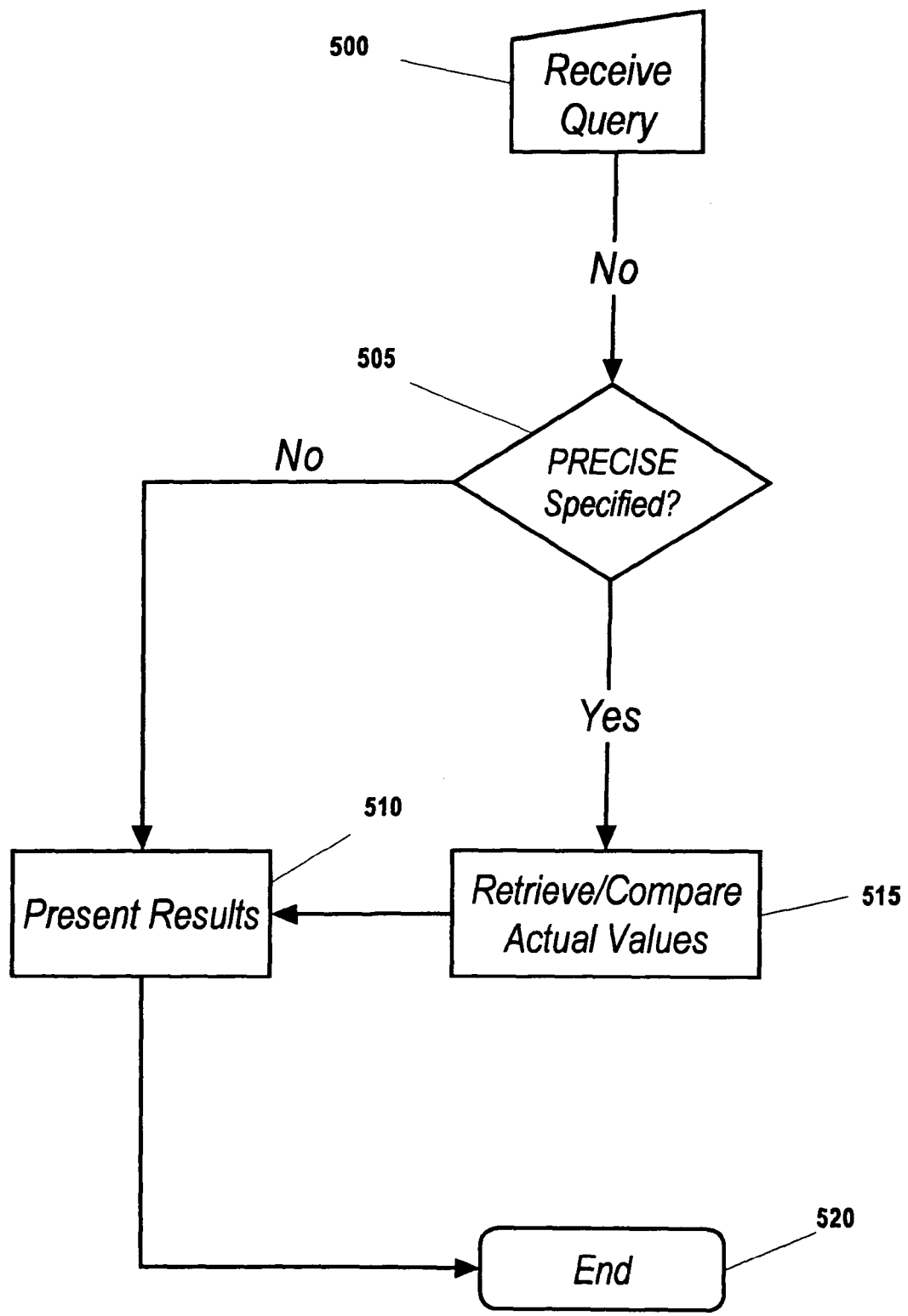
FIG. 5 is a flow diagram showing highlighted steps used to process queries according to the preferred embodiment of the present invention.

FIG. 5 is a flow diagram showing highlighted steps used to process queries according to the preferred embodiment of the present invention. Queries are received in block 500. The query is parsed to determine if the keyword PRECISE has been specified. In the preferred embodiment, the PRECISE keyword has been added to the grammar of the query mechanism of Computer System 100 (i.e., Structured Query Language (SQL) of the preferred embodiment); however, those skilled in the art appreciate that other terms and methods could be used that would effectively identify the need to examine the actual column values instead of relying solely on the normalized values in the index. The argument of the PRECISE keyword is then compared to the actual to-be-returned value [block 515] and presents [block 510] only those records to the user having values that precisely match that specified in the argument. Processing then ends in block 520.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. Thus, the description as set forth is not intended to be exhaustive or to limit the invention to the precise form disclosed. Many modifications and variations are possible in light of the above teaching without departing from the spirit and scope of the following claims.

What is claimed is:

1. A method of adding an entry to a database index, said method comprising the steps of:
   identifying a first decimal floating point value placed into said database index, said first decimal floating point value from a database column, said database column containing at least one decimal floating point value of a first precision and at least one decimal floating point value of a second precision, said first precision being different from said second precision;
   normalizing said first decimal floating point value to produce a normalized value, wherein all normalized values of decimal floating point values from said database column have a common precision; and
   inserting said entry into said index, said entry including said normalized value.

2. The method of claim 1 wherein said value is a key value.

3. The method of claim 1 wherein said identifying, normalizing, and inserting steps are performed as part of creating a new database index.

4. The method of claim 1 wherein said identifying, normalizing, and inserting steps are performed as part of updating an existing database index.

5. A method for improving the performance of a client's program, said method comprising the steps of:
   modifying a database engine to perform the sub-steps of,
   identifying a first decimal floating point value placed into said database index, said first decimal floating point value from a database column, said database column containing at least one decimal floating point value of a first precision and at least one decimal floating point value of a second precision, said first precision being different from said second precision;
   normalizing said first decimal floating point value to produce a normalized value, wherein all normalized values of decimal floating point values from said database column have a common precision; and
   inserting said entry into said index, said entry including said normalized value; and
   providing said database engine to said client.

6. The method of claim 5 wherein said value is a key value.

7. The method of claim 5 wherein said identifying, normalizing, and inserting steps are performed as part of creating a new database index.

8. The method of claim 5 wherein said identifying, normalizing, and inserting steps are performed as part of updating an existing database index.

9. A method of improving the performance of a client's program, said method comprising the steps of:
   modifying a database engine to include:
   a) an enhanced database index, said enhanced database index having normalized key values stored therein, said normalized key values representing non-normalized values;
   b) a program for accessing said enhanced database index, said program configured to select said normalized key values as return results and configured to select said non-normalized values as return results; and
   providing said database engine to said client.

10. The method of claim 9 wherein said program is capable of selecting return results based upon a query language keyword.

11. The method of claim 10 wherein the query language is structured query language (SQL).

12. The method of claim 11 wherein said keyword is a PRECISE keyword which is added to the grammar of SQL.

13. A method for providing an enhanced database engine to a customer, said method comprising the steps of:
   obtaining a license to a commercially available database engine, said database engine including an indexing mechanism and a query mechanism;
   modifying said indexing mechanism configured to generate a database index including normalized key values stored therein, said normalized key values representing non-normalized values;
   modifying said query mechanism configured to select said normalized key values as return results and configured to select said non-normalized values as return results; and
   providing said database engine to said client.

14. The method of claim 13 wherein said query mechanism configured to select return results based upon a query language keyword.

15. The method of claim 14 wherein said query language is structured query language (SQL).

16. The method of claim 15 wherein said keyword is a PRECISE keyword which is 2 added to the grammar of SQL.

17. A computer-implemented method of managing a computerized database, comprising the steps of:
   maintaining a database table having a plurality of entries and a plurality of columns, wherein a first column of said table contains entries in a numerical format supporting different precision, a first plurality of said entries containing respective values in said first column represented in a first precision, and a second plurality of said entries containing respective values in said first column represented in a second precision different from said first precision;
   maintaining an index for said database table, said index containing normalized values representing said values in said first column, said normalized values being represented in a common precision;

responsive to database queries of a first type, identifying values in said first column which have different precision but identical normalized representation in said index as equivalent; and responsive to database queries of a second type, identifying values in said first column which have different precision but identical normalized representation in said index as not equivalent.

18. The method of claim 17 wherein said numerical format is a decimal floating point format.

19. The method of claim 17 each said database query contains a query language keyword determining whether the query is a query of said first type or a query of said second type.

* * * * *